United States Patent
Naito et al.

(10) Patent No.: US 9,922,772 B2
(45) Date of Patent: Mar. 20, 2018

(54) SOLID ELECTROLYTIC CAPACITOR ELEMENT

(71) Applicant: SHOWA DENKO K.K., Tokyo (JP)

(72) Inventors: Kazumi Naito, Tokyo (JP); Katsutoshi Tamura, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 14/910,723

(22) PCT Filed: Aug. 8, 2014

(86) PCT No.: PCT/JP2014/070978
§ 371 (c)(1),
(2) Date: Feb. 8, 2016

(87) PCT Pub. No.: WO2015/020185
PCT Pub. Date: Feb. 12, 2015

(65) Prior Publication Data
US 2016/0189873 A1    Jun. 30, 2016

(30) Foreign Application Priority Data
Aug. 9, 2013    (JP) ................................ 2013-166159

(51) Int. Cl.
*H01G 9/042* (2006.01)
*H01G 9/15* (2006.01)
*H01G 9/00* (2006.01)
*H01G 9/07* (2006.01)

(52) U.S. Cl.
CPC .......... *H01G 9/042* (2013.01); *H01G 9/0032* (2013.01); *H01G 9/0425* (2013.01); *H01G 9/07* (2013.01); *H01G 9/15* (2013.01)

(58) Field of Classification Search
None
See application file for complete search history.

(56) References Cited

U.S. PATENT DOCUMENTS

| 8,310,816 B2 * | 11/2012 | Chacko | .................. H01G 9/012 361/523 |
| 9,190,214 B2 * | 11/2015 | Chacko | .................. H01G 9/004 |
| 2005/0280978 A1 * | 12/2005 | Sakaguchi | ............... H01G 9/10 361/523 |

(Continued)

FOREIGN PATENT DOCUMENTS

| JP | 10-050561 A | 2/1998 |
| JP | 2000-323364 A | 11/2000 |

(Continued)

OTHER PUBLICATIONS

International Search Report for PCT/JP2014/070978 dated Sep. 9, 2014.

*Primary Examiner* — Dion R Ferguson
(74) *Attorney, Agent, or Firm* — Sughrue Mion, PLLC

(57) ABSTRACT

A solid electrolytic capacitor element which comprises an anode body, a dielectric layer placed so as to cover the anode body, a semiconductor layer placed on the dielectric layer, an insulator layer placed on the semiconductor layer, a carbon layer placed on the insulator layer, and a silver layer placed on the carbon layer, wherein the insulator layer has a part having a thickness of 10 to 100 nm accounting for not less than $2/3$ of the whole insulator layer.

15 Claims, 1 Drawing Sheet

(56) References Cited

U.S. PATENT DOCUMENTS

| | | | | |
|---|---|---|---|---|
| 2007/0171596 A1* | 7/2007 | Chacko | ................. | H01G 9/012 |
| | | | | 361/523 |
| 2011/0261503 A1* | 10/2011 | Aoyama | ............. | H01G 9/0029 |
| | | | | 361/524 |
| 2012/0147530 A1 | 6/2012 | Ueda | | |
| 2014/0340820 A1* | 11/2014 | Chen | ................... | H01G 9/0036 |
| | | | | 361/525 |

FOREIGN PATENT DOCUMENTS

| | | |
|---|---|---|
| JP | 2008-198681 A | 8/2008 |
| JP | 2009-224568 A | 10/2009 |
| JP | 2009-239145 A | 10/2009 |
| JP | 2012-129293 A | 7/2012 |

\* cited by examiner

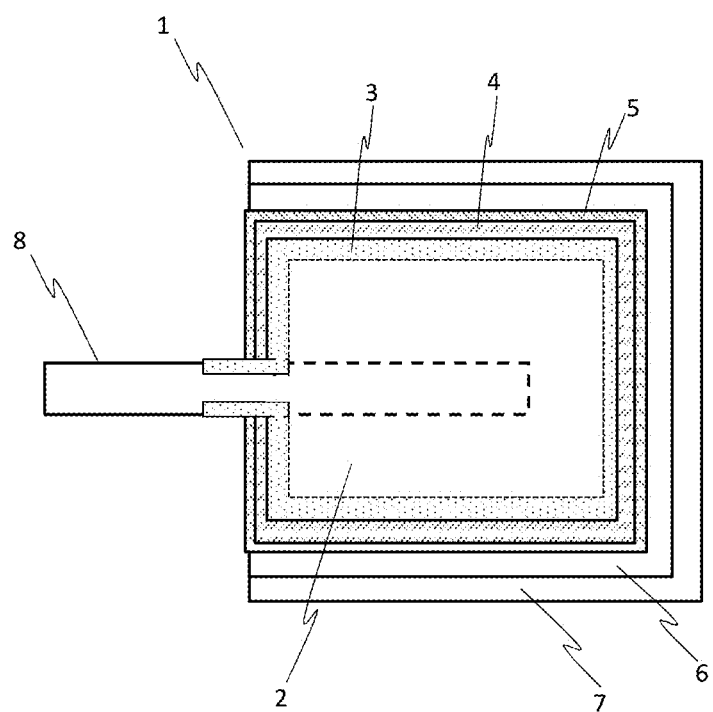

SOLID ELECTROLYTIC CAPACITOR ELEMENT

CROSS REFERENCE TO RELATED APPLICATIONS

This is a National Stage of International Application No. PCT/JP2014/070978 filed Aug. 8, 2014, claiming priority based on Japanese Patent Application No. 2013-166159 filed Aug. 9, 2013, the contents of all of which are incorporated herein by reference in their entirety.

TECHNICAL FIELD

The present invention relates to a solid electrolytic capacitor element. More specifically, the present invention relates to a solid electrolytic capacitor element of which the capacity is not greatly changed even when it is left for a long period.

BACKGROUND ART

A solid electrolytic capacitor element is usually composed of an anode body, and a dielectric layer and a cathode layer stacked in this order on the anode body. The cathode layer is usually composed of a semiconductor layer, a carbon layer and a silver layer stacked in this order on the dielectric layer. If the solid electrolytic capacitor element having a capacity set to a predetermined value is left for a long period before encapsulating with a resin or the like, the capacity may change. For example, the leaving for a long period increases a capacity of a solid electrolytic capacitor element using an anode body comprising tungsten, or the leaving for a long period decreases a capacity of a solid electrolytic capacitor element using an anode body comprising aluminum, tantalum or niobium. A great change in capacity is undesirable for electronic components in both cases of increase or decrease. The increasing of capacity is remarkable in a solid electrolytic capacitor element using an anode body comprising tungsten.

Techniques intended to decrease leakage current have been proposed. For example, Patent Document 1 discloses a solid electrolytic capacitor which comprises an anode body, a dielectric placed on the surface of the anode body, a conductive polymer placed on the surface of the dielectric, an insulating portion placed in an island shape on the surface of the conductive polymer, and a current collector placed on the surfaces of the insulating portion and the conductive polymer, wherein the insulating portion comprises at least one selected from the group consisting of alumina, an alumina hydrate, silica and a silica hydrate.

In addition, Patent Document 2 discloses a solid electrolytic capacitor characterized in that, the solid electrolytic capacitor comprises an anode member, and a dielectric layer, a solid electrolytic layer, a cathode lead-out layer and an outer shell resin layer placed in this order on the outside of the anode member; and further comprises a protective layer, made of a material mainly comprising an inorganic oxide, between the cathode lead-out layer and the outer shell resin layer.

CITATION LIST

Patent Literatures

Patent Document 1: JP 2008-198681 A
Patent Document 2: JP 2000-323364 A

SUMMARY OF THE INVENTION

Problems to be Solved by the Invention

An object of the present invention is to provide a solid electrolytic capacitor element of which the capacity is not greatly changed even when it is left for a long period.

Means for Solving the Problems

As a result of earnest investigations in order to achieve the above object, the inventors completed the present invention including the aspects described below.

[1] A solid electrolytic capacitor element which comprises an anode body, a dielectric layer placed so as to cover the anode body, a semiconductor layer placed on the dielectric layer, an insulator layer placed on the semiconductor layer, a carbon layer placed on the insulator layer and a silver layer placed on the carbon layer, wherein the insulator layer has a part having a thickness of not less than 10 nm and not more than 100 nm accounting for not less than $2/3$ of the whole insulator layer.

[2] The solid electrolytic capacitor element according to the aspect [1], wherein the insulator layer comprises silicone.

[3] The solid electrolytic capacitor element according to the aspect [1], wherein the insulator layer comprises an inorganic oxide.

[4] The solid electrolytic capacitor element according to the aspect [3], wherein the inorganic oxide comprises at least one selected from the group consisting of silicon dioxide, titanium dioxide, zirconium oxide and hafnium oxide.

[5] The solid electrolytic capacitor element according to any one of the aspects [1] to [4], wherein the insulator layer comprises nanoparticles having an average particle diameter of 1 nm to 90 nm.

[6] The solid electrolytic capacitor element according to any one of the aspects [1] to [5], wherein the carbon layer is formed using an organic solvent-based carbon paste.

[7] The solid electrolytic capacitor element according to any one of the aspects [1] to [6], wherein the anode body comprises tungsten.

[8] A solid electrolytic capacitor which comprises the solid electrolytic capacitor element according to any one of the aspects [1] to [7].

[9] A method for manufacturing a solid electrolytic capacitor element, the method comprising preparing an anode body, forming a dielectric layer so as to cover the anode body, forming a semiconductor layer on the dielectric layer, forming an insulator layer by coating the semiconductor layer with a dispersion liquid of insulator particles so that the insulator layer has a part having a thickness of not less than 10 nm and not more than 100 nm accounting for not less than $2/3$ of the whole insulator layer, forming a carbon layer on the insulator layer, and then forming a silver layer on the carbon layer.

Advantageous Effects of the Invention

In the solid electrolytic capacitor element according to the present invention, the capacity is not greatly changed even when it is left for a long time period.

BRIEF DESCRIPTION OF THE DRAWINGS

The FIGURE is a sectional view of a solid electrolytic capacitor element 1 in accordance with the invention, including an anode body 2, a dielectric layer 3 placed so as to cover the anode body 2, a semiconductor layer (cathode) 4 placed on the dielectric layer 3, an insulator layer 5 placed on the semiconductor layer 4, a carbon layer 6 placed on the insulator layer 5, a silver layer 7 placed on the carbon layer 6 and an anode lead wire 8 including an anode lead portion embedded in the anode body 2.

EMBODIMENTS FOR CARRYING OUT THE INVENTION

The solid electrolytic capacitor element according to the present invention comprises an anode body, a dielectric layer placed so as to cover the anode body, a semiconductor layer placed on the dielectric layer, an insulator layer placed on the semiconductor layer, a carbon layer placed on the insulator layer and a silver layer placed on the carbon layer.

The anode body constituting the present invention is not especially limited, as long as it functions as an anode in the solid electrolytic capacitor element. The anode body is preferably produced from a valve action metal or a conductive oxide of the valve action metal. As the valve action metal, mentioned are aluminum, tantalum, niobium, titanium, tungsten and the like. It may be an alloy comprising the valve action metal and other elements as long as properties as an anode body are not diminished. Among them, tungsten is preferable because the effects of the present invention are remarkable when it is used.

The anode body is preferably a porous body for securing a wide surface area per volume. The porous body can be obtained by a method comprising compressing a powder of a valve action metal to obtain a compact and firing the compact for sintering. Note that an anode lead wire is generally planted in the anode body for connection with an anode lead mentioned below.

The valve action metal powder as a raw material has a 50% particle diameter in volume-based cumulative particle size distribution of preferably 0.1 μm to 1 μm, more preferably 0.1 μm to 0.7 μm, even more preferably 0.1 μm to 0.3 μm. The valve action metal powder may be in the form of a granulated powder. The granulated powder can be produced by firing, crushing, etc. the raw metal powder. The granulated powder has a 50% particle diameter in volume-based cumulative particle size distribution of preferably 20 μm to 170 μm, more preferably 26 μm to 140 μm. The granulated powder is preferably a porous powder which is produced by sintering the raw metal powder. In addition, the 50% particle diameter can be calculated by measuring the volume-based particle size distribution in a laser diffraction scattering method using HRA 9320-X100 produced by MICRO TRACK CO., LTD, etc.

The dielectric layer is placed so as to cover the anode body. In a case of an anode body composed of a porous body, the dielectric layer is placed on the outer surface and the pore inner surface of the anode body. The dielectric layer generally comprises an oxide of a material constituting the anode body, specifically an oxide of a valve action metal. The dielectric layer can generally be formed by chemical conversion treatment. The chemical conversion treatment comprises immersing an anode body in a chemical conversing solution, and electrolytic oxidizing. The thickness of the dielectric layer can be controlled by conditioning a voltage at the time of electrolytic oxidizing. As the chemical conversion solution, for example, used may be a solution containing an electrolyte comprising an acid such as sulfuric acid, boric acid, oxalic acid, adipic acid, phosphoric acid, nitric acid or the like; or alkali metal salts or ammonium salts thereof. The chemical conversion solution may contain an oxidant for supplying oxygen such as hydrogen peroxide, ozone or the like as long as the effects of the present invention are not impaired. For the chemical conversion solution, a compound doubling as an electrolyte and an oxidant, e.g. persulfate, etc. can also be used. The anode body treated with chemical conversion (hereinafter, called "member") is taken out of the chemical conversion solution, washed with pure water, and then dried. Drying is not especially limited, as long as it is carried out under conditions of a temperature and a time allowing for transpiration of water attached to the member. Heat treatment may be carried out for drying. The heat treatment is carried out at preferably not more than 250° C., more preferably 160° C. to 230° C. After the heat treatment, chemical conversion treatment may be performed again. The second chemical conversion treatment can be carried out under the same conditions as in the first chemical conversion treatment. After the second chemical conversion treatment, washing with pure water and drying can be carried out in the same way as described above.

The semiconductor layer is placed on the dielectric layer obtained by the method described above. The semiconductor layer is not especially limited as long as it functions as a cathode of a solid electrolytic capacitor element. As suitable substances constituting the semiconductor layer, conductive polymers such as polythiophene or the like and derivatives thereof may be mentioned. A semiconductor layer comprising a conductive polymer can be obtained e.g. by chemical oxidation polymerization or electrolytic oxidation polymerization of a precursor (monomer) of the conductive polymer on the surface of the dielectric layer.

The insulator layer is placed on the semiconductor layer. Additionally, the insulator layer has a part having a thickness of not less than 10 nm and not more than 100 nm accounting for not less than ⅔, preferably not less than ¾, most preferably 1/1 of the whole insulator layer. A thickness distribution of the insulator layer can be determined e.g. by observing a fracture cross-section of the solid electrolytic capacitor element with a scanning electron microscope (SEM) to measure a thickness of the insulator layer at apart randomly selected from the SEM observation image, or by analyzing the SEM observation image using a known image processing method.

The insulator layer has preferably water-repellent property.

Preferably, the insulator layer does not increase an electrical resistance between the semiconductor layer and a carbon layer to be described. Specifically, it is preferable that electronic transmission due to a tunnel effect or the like is caused by modulating the structure or thickness of the insulator layer in the nano-order. For facilitating electronic transmission, the insulator layer is preferably a layer comprising nanoparticles, and more preferably a lamination layer comprising a plurality of thin layers comprising nanoparticles. An average particle diameter of the nanoparticles is preferably 1 nm to 90 nm, more preferably 2 nm to 50 nm, even more preferably 3 nm to 30 nm. The average particle diameter of the nanoparticles can be determined by X-ray small angle scattering or the like.

Preferable examples of the nanoparticles constituting an insulator layer may include nanoparticles comprising organic silicon compounds such as silicone nanoparticles or the like; and nanoparticles comprising inorganic oxides such as silicon dioxide, titanium dioxide, zirconium oxide, hafnium oxide or the like. Among them, silicone nanoparticles or titanium dioxide nanoparticles are preferable. As the titanium dioxide nanoparticles to be used, those surface-treated with silica, those bound to stearic acid, those containing ammonium polyacrylate, or the like may be mentioned.

The insulator layer is not especially limited by its formation method. The insulator layer can be obtained by coating the semiconductor layer with a coating liquid comprising a dispersion of insulator particles of which the concentration has been conditioned with e.g. water or a water-soluble organic solvent such as alcohol (for example, an aqueous dispersion of silicone nanoparticles or titanium dioxide nanoparticles, a sol comprising silicone nanoparticles or titanium dioxide nanoparticles, etc.) and then drying it. Commercially available products may be used as the coating liquid. For example, a liquid formulation of silicone nanoparticles manufactured by COMMENCE LTD. (e.g. Trade name: "Hajikkusu"), a liquid formulation of titanium dioxide nanoparticles manufactured by ISHIHARA SANGYO KAISHA, LTD. (e.g. a water dispersant STS-21 (model number), etc.), and a liquid formulation of titanium dioxide nanoparticles manufactured by TAYCA CORPORATION (e.g. a coating agent TKC-304 (model number), etc.) can be used. The insulator layers produced by these methods have water-repellent property.

The thickness and the layer structure of the insulator layer can be modulated by conditioning the concentration of the nanoparticles contained in the coating liquid and the frequency of the coating treatment with the coating liquid. When the insulator layer is too thick, electrical resistance is increased, and when it is too thin, the effect of the layer is decreased.

The carbon layer is placed on the insulator layer. The carbon layer can be obtained, for example, by coating the insulator layer with a paste comprising carbon black, and drying it. The solvent used for the paste may be water, but it is preferable to use an organic solvent in a case where the insulator layer has water-repellent property. In order to increase the strength of the carbon layer, the carbon layer may comprise a binder. The binder may include a resin binder, etc.

The silver layer is placed on the carbon layer. The silver layer can be obtained, for example, by coating the carbon layer with a silver-containing paste and drying. In order to increase the strength of the silver layer, the silver layer may contain a binder. The binder may include a resin binder such as methacrylic resin, etc.

The cathode lead is electrically connected to the surface of the cathode layer, specifically the surface of the silver layer, and the cathode lead is exposed to the outside of the exterior of the solid electrolytic capacitor and used as a cathode external terminal. Usually, silver paste or the like is used to connect the cathode layer and the cathode lead to each other. Meanwhile, the anode lead is electrically connected through a wire material (anode lead wire) planted into the anode body, and the anode lead is exposed to the outside of the exterior of the solid electrolytic capacitor and used as an anode external terminal. A conventional lead frame can be used for attachment of the cathode lead and the anode lead. Subsequently, an exterior can be formed by sealing with resin or the like to obtain a solid electrolytic capacitor. For the solid electrolytic capacitor produced in such a way, aging treatment can be carried out as required. The solid electrolytic capacitor obtained in such a way can be used for various electronic circuits and electric circuits.

EXAMPLES

The present invention will be more specifically explained below with reference to Examples of the present invention.

It should be noted that these are merely examples for explanation and the present invention is not limited by them in any way.

Evaluation was carried out by the following methods in the Examples.

(Thickness Frequency Distribution of the Insulator Layer)

A fracture cross-section sample of the solid electrolytic capacitor element was prepared, and a 100,000-fold image of the cross section was obtained by a scanning electron microscope (SEM). The thicknesses at 50 locations of the insulator layer were randomly measured in a 10 μm-square field of view per one sample. The measured data was classified into less than 10 nm, not less than 10 nm and not more than 100 nm, and more than 100 nm. The measured data was compiled for 10 samples, and a proportion of the thickness frequency classified into the range of not less than 10 nm and not more than 100 nm in the data was calculated.

(Capacity)

The solid electrolytic capacitor element was dried using a thermostatic dryer at 100° C. in air for 5 minutes. Immediately after that, electric leads wired to an LCR measuring instrument manufactured by Agilent Technologies, Inc were attached to the cathode layer of the capacitor element and the anode lead wire planted into the capacitor element. A capacity at 120 Hz was measured at 2.5 V bias voltage by the LCR measuring instrument. An average value of the measured values of 30 randomly selected capacitor elements was calculated.

(50% Particle Diameter and Particle Diameter Range)

A particle size distribution was measured by a laser diffraction scattering method using HRA 9320-X100 manufactured by MICRO TRACK CO., LTD. to determine a 50% particle diameter (D50), 10% particle diameter (D10) and 90% particle diameter (D90) in the volume-based cumulative particle size distribution. A range from D10 to D90 was defined as a "particle diameter range".

(Elementary Analysis)

The element contents in the anode body were determined by ICP emission spectrometry. In addition, using an oxygen/nitrogen analyzer (TC600, LECO Corporation), nitrogen content and oxygen content in the anode body were determined by a thermal conductivity method and infrared absorption spectrometry, respectively. An average value of two randomly-selected anode bodies was calculated.

Example 1

A tungsten trioxide powder was reduced with hydrogen to obtain a tungsten raw material powder having a 50% particle diameter of 0.5 μm (particle diameter range: 0.08 μm to 20 μm). This was left under vacuum at 1430° C. for 30 minutes to obtain a massive material. The massive material was pulverized in an agate mortar at room temperature to obtain a granulated powder having a 50% particle diameter of 76 μm (particle diameter range of 26 μm to 180 μm, bulk specific gravity of 3.2 g/cm$^3$, oxygen content of 4800 mass ppm, nitrogen content of 550 mass ppm, and BET specific surface area of 0.76 m$^2$/g).

This granulated powder was compressed to obtain a compact. This compact was fired at 1500° C. under vacuum for 20 minutes to produce a sintered compact with dimensions 1.0 mm×1.5 mm×4.5 mm (powder mass of 61 mg, BET specific surface area of 0.53 m$^2$/g). In addition, a tantalum wire with a 0.29 mm diameter which serves as an anode lead wire was planted into a center of a 1.0 mm×1.5 mm surface of the sintered compact.

The sintered compact was immersed in a 3 mass % ammonium persulphate aqueous solution (chemical conversion solution), electrolytic oxidation was started at an initial current density of 2 mA per one sintered compact at 45° C., and from a time when the voltage reached 10 V, electrolytic oxidation was carried out while maintaining 10 V for 5 hours to chemically convert an inner porous surface, an outer surface and a surface to a 3-mm height from the base of the anode lead wire of the sintered compact into an oxide, resulting in a dielectric layer. The sintered compact was taken out of the chemical conversion solution, immersed in water for washing, then immersed in ethanol, and finally dried at 190° C. for 15 minutes.

Next, a polymerization solution comprising a mixed solvent composed of 70 mass % of water and 30 mass % of ethylene glycol, 4 mass % of anthraquinone sulphonic acid, and a saturated concentration of ethylene dioxythiophene was prepared. This polymerization solution was accumulated in a vessel with a stirrer, into which the sintered compact having the formed dielectric layer was immersed to a depth of the base of the anode lead wire, and electrolytic polymerization was carried out at a current density of 60 μA per one sintered compact at 23° C. for 60 minutes. The sintered compact was taken out of the polymerization solution, immersed in water for washing, then immersed in ethanol, and finally dried at 105° C. for 15 minutes.

Subsequently, the sintered compact was immersed in a 3 mass % ammonium persulphate aqueous solution (chemical conversion solution), electrolytic oxidation was started at an initial current density of 0.5 mA per one sintered compact at 23° C., and from a time when the voltage reached 7 V, electrolytic oxidation (post-chemical conversion) was carried out while maintaining 7 V for 15 minutes.

The electrolytic polymerization and the post-chemical conversion were repeated 6 times to form a semiconductor layer comprising a conductive polymer on the dielectric layer. Note that the second electrolytic polymerization was carried out at a current density of 60 μA per one sintered compact, the third to fifth electrolytic polymerizations were carried out at a current density of 80 μA per one sintered compact, and the sixth electrolytic polymerization was carried out at a current density of 120 μA per one sintered compact.

A coating liquid formulation was prepared by mixing 3 mass % of a silicone nanoparticle liquid formulation ("Hajikkusu" manufactured by COMMENCE LTD.), 7 mass % of water, and 90 mass % of ethanol. The sintered compact having the semiconductor layer was immersed to a depth of the base of the anode lead wire in the coating liquid formulation. The sintered compact was taken out of the coating liquid formulation, dried at 105° C. for 15 minutes to form an insulator layer comprising the silicone nanoparticles on the semiconductor layer.

The sintered compact having the insulator layer was immersed to a depth of a position where the surface on which the anode lead wire was planted was not immersed in a carbon solution (based on an organic solvent) (Electrodag PR406 manufactured by Acheson Industries, Inc.), taken out of the carbon solution, and dried to form a carbon layer on the insulator layer except for the surface on which the anode lead wire was planted.

Subsequently, the sintered compact having the carbon layer was immersed to a depth of a position where the surface on which the anode lead wire was planted was not immersed in a silver paste solution, taken out of the silver paste solution, and dried to form a silver layer on the carbon layer.

By the above-described operations, 40 solid electrolytic capacitor elements were produced.

For 10 solid electrolytic capacitor elements randomly selected from the obtained solid electrolytic capacitor elements, thickness frequency distributions of the insulator layers were measured.

Firstly-measured thickness frequency distributions of an insulator layer of one solid electrolytic capacitor element are shown in Table 1. Each of the insulator layers of 10 solid electrolytic capacitor elements had a part having a thickness of 10 to 100 nm accounting for not less than ⅔ of the whole insulator layer.

For the 30 remaining solid electrolytic capacitor elements, their capacities were measured at 120 Hz, and their average value (initial capacity) was calculated. Subsequently, 30 solid electrolytic capacitor elements were left in an air atmosphere at 125° C. for 5 days. Then, the capacities at 120 Hz were measured to calculate their average value (capacity after being left). The results are shown in Table 1.

Examples 2 and 3, Comparative Examples 1 to 3

40 solid electrolytic capacitor elements were produced in the same manner as Example 1 except that the coating liquid formulation was changed to formulations prescribed as shown in Table 1. The solid electrolytic capacitor elements were evaluated in the same manner as Example 1. The results are shown in Table 1. Note that the capacities in Comparative Examples 1 and 2 could not be measured because ESR was excessively increased.

Comparative Example 4

40 solid electrolytic capacitor elements were produced in the same manner as Example 1 except that the insulator layer was not placed. The solid electrolytic capacitor elements were evaluated in the same manner as Example 1. The results are shown in Table 1.

Example 4

40 solid electrolytic capacitor elements were produced in the same manner as Example 1 except that the coating liquid formulation used in Example 1 was changed to a coating liquid formulation prepared by mixing 2 mass % of titania nanoparticle liquid formulation ("STS-21", ISHIHARA SANGYO KAISHA, LTD.), 18 mass % of water and 80 mass % of ethanol. The solid electrolytic capacitor elements were evaluated in the same manner as Example 1. The results are shown in Table 1.

Example 5, Comparative Examples 5 and 6

40 solid electrolytic capacitor elements were produced in the same manner as Example 4 except that the coating liquid formulation was changed to formulations prescribed as shown in Table 1. The solid electrolytic capacitor elements were evaluated in the same manner as Example 1. The results are shown in Table 1. Note that the capacity in Comparative Example 5 could not be measured because ESR was excessively increased.

TABLE 1

|  | Ex. | | | Comp. Ex. | | | | Ex. | | Comp. Ex. | |
| --- | --- | --- | --- | --- | --- | --- | --- | --- | --- | --- | --- |
|  | 1 | 2 | 3 | 1 | 2 | 3 | 4 | 4 | 5 | 5 | 6 |
| Coating liquid [mass %] | | | | | | | | | | | |
| Hajikkusu | 3 | 1 | 0.4 | 10 | 4 | 0.3 | | | | | |
| STS-21 | | | | | | | | 2 | 0.7 | 8 | 0.1 |
| Water | 7 | 4 | 1.6 | 80 | 26 | 0.7 | | 18 | 2.3 | 22 | 0.9 |
| Ethanol | 90 | 95 | 98 | 10 | 70 | 99 | | 80 | 97 | 70 | 99 |
| Thickness frequency distribution of insulator layer | | | | | | | | | | | |
| less than 10 nm | 0 | 0 | 9 | 8 | 9 | 19 | — | 2 | 12 | 1 | 27 |
| not less than 10 nm and not more than 100 nm | 45 | 44 | 34 | 13 | 30 | 25 | — | 41 | 36 | 6 | 23 |
| more than 100 nm | 5 | 6 | 7 | 29 | 11 | 6 | — | 7 | 2 | 43 | 0 |
| Proportion of a part having a thickness of not less than 10 nm and not more than 100 nm | 0.90 | 0.88 | 0.68 | 0.26 | 0.60 | 0.50 | — | 0.82 | 0.72 | 0.12 | 0.46 |
| Initial capacity[μF] | 247 | 255 | 258 | — | — | 260 | 262 | 244 | 250 | — | 253 |
| Ratio of capacity after being left relative to initial capacity | 1.02 | 1.04 | 1.04 | — | — | 1.25 | 1.32 | 1.06 | 1.07 | — | 1.29 |

\* The thickness frequency distributions of insulator layer are the measurement results for one firstly-measured solid electrolytic capacitor element.

Example 6

500 g of tungsten raw material powder obtained in the same manner as Example 1 and 1500 g of water were put in a 2 L beaker and stirred at 100 rpm for 5 minutes. Particles floating in the liquid were sucked together with water by a syringe 10 seconds after the discontinuation of stirring. The sucked particles were dried under vacuum at 80° C. The dried particles were pulverized in an agate mortar at room temperature to obtain 96 g of powder. The powder had a number average primary particle diameter of 0.25 μm in measurement by electron microscopy. To this powder, 0.2 mass % of crystalline silicon powder having a 50% particle diameter of 1 μm was added to obtain a mixed powder. This was left under vacuum at 1430° C. for 30 minutes to obtain a massive material. The massive material was pulverized in an agate mortar at room temperature to obtain a granulated powder. The granulated powder was confirmed to contain 0.2 mass % of silicon from elementary analysis by ICP emission spectrometry.

A sintered compact (powder mass of 55 mg, BET specific surface area of 1.3 m²/g) was produced in the same manner as Example 1 using the above granulated powder.

Subsequently, a dielectric layer, a semiconductor layer, an insulator layer, a carbon layer and a silver layer were respectively placed in the same manner as Example 1 to produce 40 solid electrolytic capacitor elements. The solid electrolytic capacitor elements were evaluated in the same manner as Example 1. The results are shown in Table 2.

Examples 7 and 8, Comparative Examples 7 to 9

40 solid electrolytic capacitor elements were produced in the same manner as Example 6 except that the coating liquid formulation was changed to formulations prescribed as shown in Table 2. The solid electrolytic capacitor elements were evaluated in the same manner as Example 1. Note that the capacity in Comparative Examples 7 and 8 could not be measured because ESR was excessively increased. The results are shown in Table 2.

Comparative Example 10

40 solid electrolytic capacitor elements were produced in the same manner as Example 6 except that the insulator layer was not placed. The solid electrolytic capacitor elements were evaluated in the same manner as Example 1. The results are shown in Table 2.

Example 9

40 solid electrolytic capacitor elements were produced in the same manner as Example 6 except that the coating liquid formulation was changed to a coating liquid formulation prepared by mixing 2 mass % of titania nanoparticle liquid formulation "STS-21" manufactured by ISHIHARA SANGYO KAISHA, LTD., 18 mass % of water and 80 mass % of ethanol. The solid electrolytic capacitor elements were evaluated in the same manner as Example 1. The results are shown in Table 2.

Example 10, Comparative Examples 11 and 12

40 solid electrolytic capacitor elements were produced in the same manner as Example 9 except that the coating liquid formulation was changed to formulations prescribed as shown in Table 2. The solid electrolytic capacitor elements were evaluated in the same manner as Example 1. The capacity in Comparative Example 11 could not be measured because ESR was excessively increased. The results are shown in Table 2.

TABLE 2

| | Ex. | | | Comp. Ex. | | | | Ex. | | Comp. Ex. | |
|---|---|---|---|---|---|---|---|---|---|---|---|
| | 6 | 7 | 8 | 7 | 8 | 9 | 10 | 9 | 10 | 11 | 12 |
| Coating liquid [mass %] | | | | | | | | | | | |
| Hajikkusu | 3 | 1 | 0.4 | 10 | 4 | 0.3 | | | | | |
| STS-21 | | | | | | | | 2 | 0.7 | 8 | 0.1 |
| Water | 7 | 4 | 1.6 | 80 | 26 | 0.7 | | 18 | 2.3 | 22 | 0.9 |
| Ethanol | 90 | 95 | 98 | 10 | 70 | 99 | | 80 | 97 | 70 | 99 |
| Thickness frequency distribution of insulator layer | | | | | | | | | | | |
| less than 10 nm | 6 | 2 | 7 | 4 | 3 | 21 | — | 3 | 2 | 0 | 35 |
| not less than 10 nm and not more than 100 nm | 34 | 43 | 37 | 11 | 30 | 25 | — | 37 | 46 | 7 | 13 |
| more than 100 nm | 10 | 5 | 6 | 35 | 17 | 4 | — | 10 | 2 | 43 | 2 |
| Proportion of a part having a thickness of not less than 10 nm and not more than 100 nm | 0.68 | 0.86 | 0.74 | 0.22 | 0.60 | 0.50 | — | 0.74 | 0.92 | 0.14 | 0.26 |
| Initial capacity[μF] | 477 | 481 | 488 | — | — | 493 | 494 | 452 | 470 | — | 475 |
| Ratio of capacity after being left relative to initial capacity | 1.03 | 1.01 | 1.01 | — | — | 1.21 | 1.25 | 1.02 | 1.01 | — | 1.28 |

* The thickness frequency distributions of insulator layer are the measurement results for one firstly-measured solid electrolytic capacitor element.

The invention claimed is:

1. A solid electrolytic capacitor element which comprises an anode body, a dielectric layer placed so as to cover the anode body, a semiconductor layer placed on the dielectric layer, an insulator layer placed on the semiconductor layer, a carbon layer placed on the insulator layer and a silver layer placed on the carbon layer, wherein the insulator layer has a part having a thickness of not less than 10 nm and not more than 100 nm accounting for not less than ⅔ of the whole insulator layer.

2. The solid electrolytic capacitor element according to claim 1, wherein the insulator layer comprises silicone.

3. The solid electrolytic capacitor element according to claim 1, wherein the insulator layer comprises an inorganic oxide.

4. The solid electrolytic capacitor element according to claim 3, wherein the inorganic oxide comprises at least one selected from the group consisting of silicon dioxide, titanium dioxide, zirconium oxide and hafnium oxide.

5. The solid electrolytic capacitor element according to claim 1, wherein the insulator layer comprises nanoparticles having an average particle diameter of 1 nm to 90 nm.

6. The solid electrolytic capacitor element according to claim 1, wherein the carbon layer is formed using an organic solvent-based carbon paste.

7. The solid electrolytic capacitor element according to claim 1, wherein the anode body comprises tungsten.

8. A solid electrolytic capacitor comprising the solid electrolytic capacitor element according to claim 1.

9. A method for manufacturing a solid electrolytic capacitor element, the method comprising:
preparing an anode body,
forming a dielectric layer so as to cover the anode body,
forming a semiconductor layer on the dielectric layer,
forming an insulator layer by coating the semiconductor layer with a dispersion liquid of insulator particles so that the insulator layer has a part having a thickness of not less than 10 nm and not more than 100 nm accounting for not less than ⅔ of the whole insulator layer,
forming a carbon layer on the insulator layer, and then forming a silver layer on the carbon layer.

10. The method according to claim 9, wherein the carbon layer forming employs an organic solvent-based carbon paste.

11. The method according to claim 9, wherein the anode body comprises tungsten.

12. The method according to claim 9, wherein the insulator particles have an average particle diameter of 1 nm to 90 nm.

13. The method according to claim 9, wherein the dispersion liquid comprises silicone.

14. The method according to claim 9, wherein the dispersion liquid comprises inorganic oxide.

15. The method according to claim 14, wherein the inorganic oxide comprises at least one selected from the group consisting of silicon dioxide, titanium dioxide, zirconium oxide and hafnium oxide.

* * * * *